United States Patent [19]

McKenzie et al.

[11] Patent Number: 4,961,670
[45] Date of Patent: Oct. 9, 1990

[54] MOLDED SEPTIC TANK

[75] Inventors: Kenneth M. McKenzie; Wayne R. Anderson; Lorne Abrams, all of Winnipeg, Canada

[73] Assignee: Bonar Inc., Burlington, Canada

[21] Appl. No.: 329,266

[22] Filed: Mar. 27, 1989

[51] Int. Cl.⁵ .................................................. B65D 6/38
[52] U.S. Cl. ...................................... 405/53; 220/5 A; 210/532.2
[58] Field of Search ............... 405/53; 220/5 A, 4 C, 220/1 B; 210/532.2, 195.1

[56] References Cited

U.S. PATENT DOCUMENTS

| | | | |
|---|---|---|---|
| 1,058,458 | 4/1913 | Payne et al. | 210/532.2 X |
| 1,638,869 | 8/1927 | Moss | 210/532.2 X |
| 1,677,626 | 7/1928 | Frappy | 210/532.2 |
| 1,715,466 | 6/1929 | Miller | 210/532.2 |
| 3,426,903 | 2/1969 | Olecko | 210/532.2 |
| 3,741,393 | 6/1973 | Estes et al. | 210/195 |
| 4,254,885 | 3/1981 | Fouss et al. | 220/5 A X |
| 4,325,823 | 4/1982 | Graham | 210/532.2 |
| 4,359,167 | 11/1982 | Fouss et al. | 220/5 A X |
| 4,579,242 | 4/1986 | Ellis III | 220/5 A |

FOREIGN PATENT DOCUMENTS

| | | | |
|---|---|---|---|
| 871399 | 5/1971 | Canada | 210/532.2 |
| 1023746 | 3/1953 | France | 220/5 A |
| 1345040 | 10/1963 | France | 220/5 A |
| 1569103 | 6/1980 | United Kingdom | 220/5 |
| 2039980 | 8/1980 | United Kingdom | 220/5 |
| 2065736 | 7/1981 | United Kingdom | 210/532.2 |

Primary Examiner—Dennis L. Taylor
Assistant Examiner—Franco S. Deliguori
Attorney, Agent, or Firm—Adrian D. Battison; Stanely G. Ade; Murray E. Thrift

[57] ABSTRACT

A septic tank is formed from a plurality of tank modules each of which comprises a substantially closed container. Each tank module is bolted to a next adjacent tank module at a flat end wall thereof with the bolts being of large diameter and in some cases including a central longitudinally extending opening so that the bolts act to communicate fluid from one tank module to the next adjacent tank module. Each tank module is shaped with an upper wall part which is of parabolic arch shape and a base wall which is substantially flat. This defines the optimum shape for strength to accommodate the forces when the tank is buried. Tanks can thus be formed in modular parts so that various different size modules can be connected together by the above coupling technique to form a multitude of different sizes of tank. An access opening in the upper wall is defined at the junction between two tank modules with the central dividing walls between the tank modules being cut down to allow a person to enter either of the tank modules from the single access opening. The tank provides a required strength at minimum wall thickness and also the end walls automatically provides bulkheads for dividing one septic compartment from the next.

19 Claims, 6 Drawing Sheets

MOLDED SEPTIC TANK

BACKGROUND OF THE INVENTION

This invention relates to a tank for containing liquid materials in an underground buried location which is particularly but not essentially suitable for a septic or holding tank in which sewage products are contained and/or treated. The term "liquid material" used herein is intended to include various liquids such as water, effluent and the like together with liquid containing various solids such as are produced or stored in a sewage waste system.

Septic and holding tanks for sewage materials have been manufactured for many years and generally the available materials from which these tanks are manufactured are concrete, glass fiber reinforced resin materials and more recently rotationally molded plastics materials.

Examples of concrete tanks are shown in U.S. Pat. Nos. 1,677,626 (Frappy); and 1,715,466 (Miller). One example of a tank formed from a glass fiber reinforced material is shown in U.S. Pat. No. 3,426,903 (Olecko). A more recent product related to a molded tank is shown in U.S. Pat. No. 3,741,393 (Estes). A further patent which is not clear about the method of construction is U.S. Pat. No. 4,325,823 (Graham) which mentions the use of "fiberglass" but is more concerned with the technique of operation of the septic system.

For reasons of weight, cost and convenience, molded tanks have become more popular in recent years but suffer from a number of problems which have reduced their effectiveness. Various shapes of molded tanks have been employed. Many tanks are generally rectangular in cross-section with curves of relatively large radiuses joining the four walls defining the top, bottom and two sides. Other shapes include a circular cross-section defining a circular cylindrical tank and a semi-circular cross-section defining a tank with a flat bottom and a semi-cylindrical upper wall.

Firstly a serious problem relates to the difficulty of forming the necessary compartments in the tank, usually achieved by attaching to the interior of a molded tank one or more bulkheads. In this way, the tank is divided into the necessary separate compartments known as septic compartments and an effluent compartment for a septic tank system. In some cases the bulk heads have been inserted into a slide track system. In other cases a welding technique has been attempted. Both techniques have been unsatisfactory particularly bearing in mind that when the tank is buried, the heavy downward weight of the above materials and severe upward forces generated by the buoyancy action of surrounding ground water tends to distort the tank. Any distortion of the tank causes the walls to pull away from the bulkhead with the danger of leaks from one compartment to the next which cannot be tolerated if the septic system is to remain environmentally acceptable.

Associated with this problem is that of developing a design which is capable of providing sufficient strength to the tank so that it can withstand the relatively high forces generated by the downward pressure of the earth and the upward buoyancy pressure of the ground water. In most cases increased strength is provided by an increased thickness of the wall but this is of course economically disadvantageous since the cost of the finished product is to a great extent directly proportional to the amount of material involved in the molding action.

SUMMARY OF THE INVENTION

It is one object of the present invention, therefore, to provide an improved tank for containing liquid in an underground buried location in which the formation of the compartments necessary for a septic tank system is provided as part of the molded tank system.

It is a further object of the present invention to provide a tank in which the strength of the tank against compressive loads is improved by the particular construction of tank so that the walls can be formed of thinner material thus reducing the total amount of material in the product.

It is a further object of the present invention to provide a particular shape of the tank which maximizes the strength obtained by the tank and the capacity of the tank while minimizing the wall thickness.

It is a further object of the present invention to provide a tank system so that a number of different tank sizes can be formed while minimizing inventory.

According to a first aspect of the invention, therefore, there is provided a tank for containing liquid materials in an underground buried location comprising a plurality of tank modules each module being separately molded from a plastics material to define a hollow substantially closed container having a cylindrical shape defined by a pair of spaced end walls and a peripheral wall having an upper wall portion and a base wall portion on which the tank rests, a connecting one of the end walls of one tank module being connected to a connecting one of the end walls of a next adjacent tank module such that each of the connecting end walls defines a flat wall part with the flat wall parts lying in contacting relationship.

According to the second aspect of the invention, therefore, there is provided a tank for containing liquid materials in an underground buried location comprising a tank body molded from a plastics material to define a hollow substantially closed container having a cylindrical shape defined by a pair of spaced end walls and a peripheral wall having an upper wall portion, a base wall portion on which the tank rests, and two junction portions each connecting a respective side edge of the base wall portion to a side edge of the upper wall portion, the body being shaped such, that in a cross section taken in a direction transverse to the side edges, the upper wall portion defines a smoothly parabolic curved arch and the base wall portion has a curvature less than that of the upper wall portion.

According to a third aspect of the invention, therefore, there is provided a set of parts for forming a septic tank for containing liquid materials in an underground buried location comprising a plurality of tank modules each module being separately molded from a plastics material to define a hollow substantially closed container having a cylindrical shape defined by a pair of spaced end walls and a peripheral wall having an upper wall portion and a base wall portion on which the tank rests, a connecting one of the end walls of one tank module having a flat wall part for connecting to a flat wall part of a connecting one of the end walls of a next adjacent tank module, means for connecting each tank module to the next adjacent tank module, means allowing communication of fluid from one tank module to the next adjacent tank module to form a septic tank with the connecting end walls defining bulk heads of the septic tank, the tank modules being of different capacities such that different ones of the tank modules can be connected to form septic tanks of different total capacities.

The use of the end walls of the separate tank modules enables the bulkheads to be formed automatically with the connection between each tank module and the next tank module providing the communication of fluid between the various compartments. The bulkheads or end walls which provide further connections across the completed full length of the tank enable the peripheral wall of the tank modules to be reduced in thickness and yet provide sufficient strength for supporting the necessary loads on the tank in the buried location.

The particular shape of the tank using an arched upper wall portion of parabolic shape and a flattened or substantially flat base wall portion provides the maximum strength for the tank wall against the loads to be accommodated while maintaining a high tank capacity and thus again reduces the necessary thickness of the peripheral wall.

The provision of the tanks in separate modules of separate sizes together with the cooperation between one tank module and the next tank module in providing the necessary access openings allows a modular system to be provided in which many different sizes of tanks can be formed by connecting two or more of the various tank modules in various combinations.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

The tank for mounting in an underground buried location is indicated generally at 10 and comprises the main cylindrical body having a peripheral wall 11 and end walls 12 and 13 transverse to a horizontal axis of the cylinder body.

Figure 2:
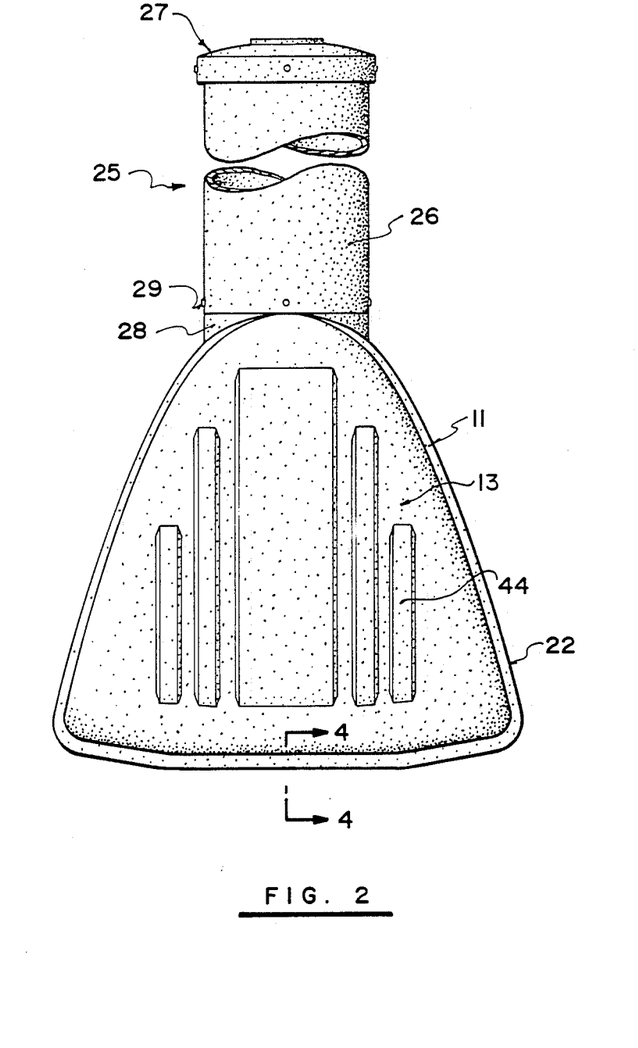
FIG. 2 is an end view of the tank of FIG. 1.
Figure 3:
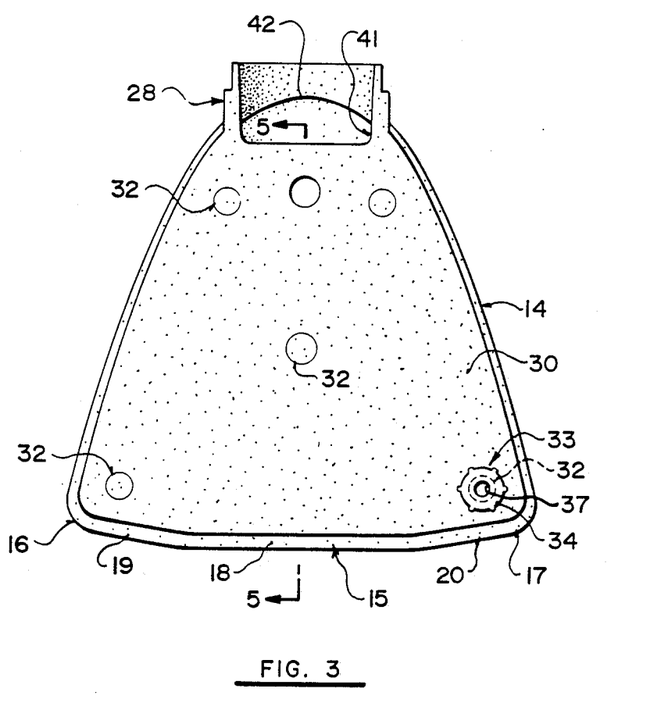
FIG. 3 is a cross sectional view of one module of the tank taken along the lines 3—3 of FIG. 1.

The peripheral wall, as best shown in FIGS. 2 and 3, includes an upper wall portion 14, a base wall portion 15 and two junction portions 16 and 17. The junction portions interconnect side edges of the base portion 15 to side edges of the upper portion 14. The base portion 15 includes a flat central part 18 and a pair of outer parts 19 and 20 both of which are inclined upwardly at a shallow angle to the central part 18. This shape provides a slight curvature effect for the base portion which increases the resistance of the base portion against upward buoyancy forces tending to float the tank out of the ground, generated by surrounding ground water. The central flat portion 18 allows the tank to sit in a stable manner on the flat central portion without a tendency to wobble when the tank is in a storage location or in transportation.

The upper wall 14 extends from the junction portions 16 and 17 in a smoothly curved arched shape. The unique design in the form of an arch, by the nature of its structural configuration, was determined to be the design which would provide maximum support for the weight of the burial volume (earth cover) over the container. It has been determined that for the earth cover conditions in question, an arch shape of the common "roman circular form" is the most effective. This design is set forth with the objective of withstanding a burial depth in the range three feet to twelve feet (that is earth distance to the bottom of the tank burial cavity).

The roman circular arch configuration is primarily designed to withstand uniform compressive loads with little or no bending stresses accounted for. The issue of bending stress is significant since in real life cases a tank would have non uniform coverage in a burial condition, that is different loads at different points on its surface. The bending stress load therefore results from unequal forces (earth weight) causing the tank to stress (want to move) in the various directions of the earth coverage (actually opposite to the earth loads).

In order to create a tank which can withstand the multitude of possible load conditions, mathematical calculations have been carried out through a series of computerized and numerical modelling techniques.

The curve function which yielded the best result to these criteria was found to be a general parabolic shape having a function $x = y^n$ where x represents the width of the arch and y represents the difference from the top of the tank arch downward to a point intersecting with the width x N represents the exponent (by curve definition) and was varied between 0.2 and 0.3 through a series of successive computer generated calculations.

The shape of the upper surface is defined by the following table:

| COORDINATE TABLE | |
|---|---|
| X(CM) | Y(CM) |
| 0 | 165.00 |
| 11.81 | 163.28 |
| 20.81 | 159.31 |
| 27.56 | 154.15 |
| 32.63 | 149.01 |
| 37.13 | 143.47 |
| 40.50 | 138.71 |
| 46.69 | 128.53 |
| 52.31 | 117.63 |
| 56.81 | 107.73 |
| 60.75 | 98.18 |
| 64.69 | 87.80 |
| 68.08 | 78.22 |
| 71.44 | 68.00 |
| 74.81 | 57.14 |
| 77.63 | 47.58 |
| 80.44 | 37.57 |
| 82.69 | 29.23 |
| 85.50 | 18.36 |
| 88.34 | 7.03 |
| 90.00 | 0.00 |

Figure 4:
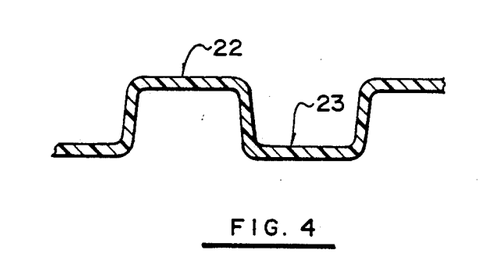
FIG. 4 is a cross sectional view along the lines 4—4 of FIG. 2.

The above curvature therefore maximizes the strength of the wall shape. However, to yet further improve the wall shape, ribs 22 are provided which extend around the periphery as an upstanding band. Between each rib and the next adjacent rib is a recess 23 as best shown in FIG. 4 so that the thickness of the material forming the container is substantially less than the difference in height between the ribs and the recesses.

Figure 1:
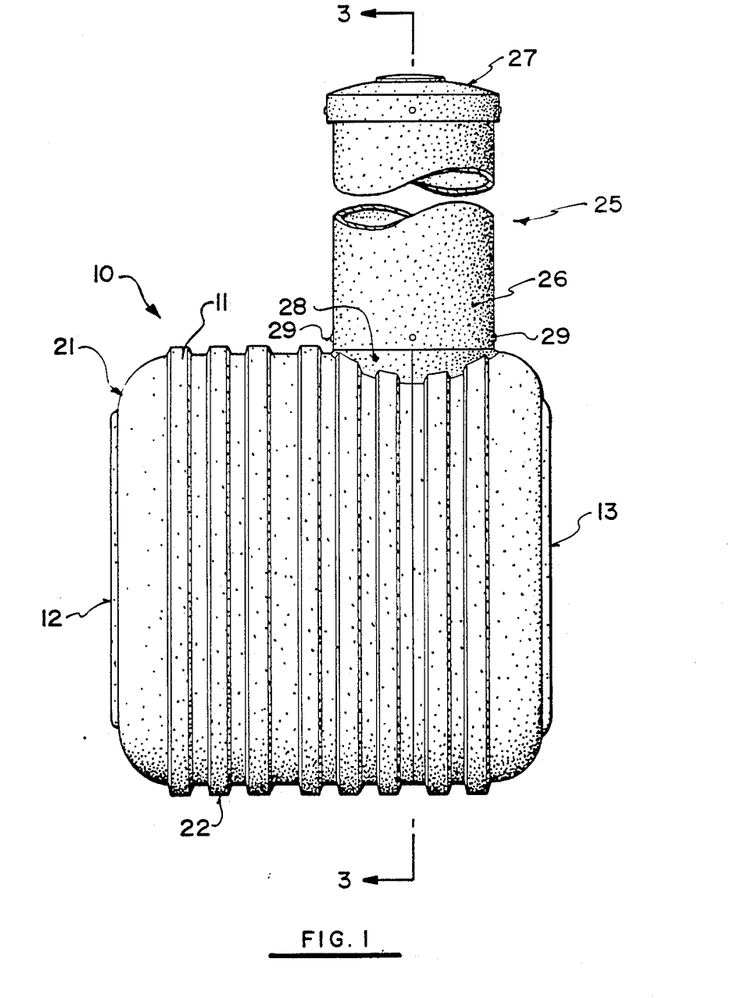
FIG. 1 is a side elevational view of a tank according to the invention.

The tank shown in FIGS. 1, 2 and 3 is formed from two separate portions with a dividing line indicated at 24. In the arrangement of FIG. 1 there are two separate portions one forming the major part of the container on the left hand side of the line 24 and the other forming a smaller part of the container on a right hand side of the line 24.

The completed tank includes an access opening generally indicated at 25 defined by a vertical circular cylindrical wall 26 which has a cover 27. As shown in FIG. 3 the circular cylindrical wall includes a bottom portion 28 which connects to a separately molded extension portion shown in FIGS. 1 and 2 which presses over the bottom portion 28 and is attached thereto by fasteners 29. The bottom portion 28 is integrally molded with the tank modules. The extension portion is a separate element the length of which is selected in dependence upon the depth of burial of the tank. The cover 27 is again a separately molded part which fastens over the upper end and readily removable for access.

It will be noted that the dividing line 24 extends also through the access opening. Thus one half of the cylindrical wall is molded with one part of the tank and the other half of the cylindrical wall is molded with the other part of the tank.

Figure 5:
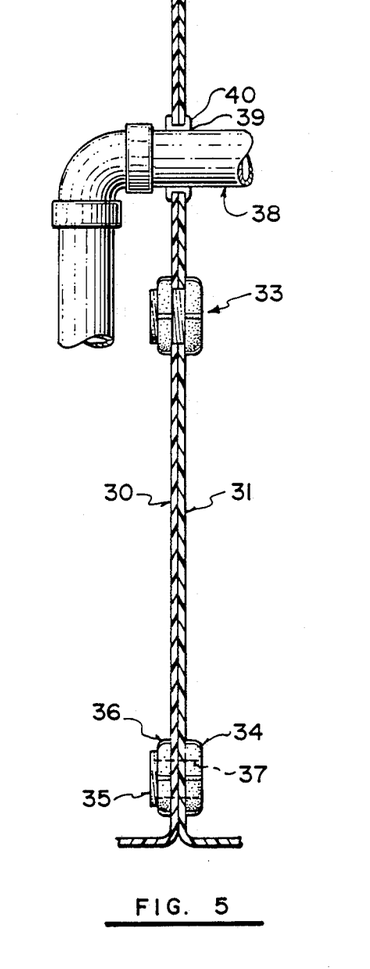
FIG. 5 is a cross sectional view along the lines 5—5 of FIG. 3.

Turning now to FIG. 3, both of the tank modules are molded in the form of a substantially closed container having two ends. Thus the left hand tank module has one end 12 and the other end 30 shown in detail in FIGS. 3 and 5. The other tank module has one end 13 and the other end 31. Each of the ends 30 and 31 as best seen in FIG. 5 is integrally molded with the remainder of its corresponding tank module so that they are directly and integrally connected to the peripheral wall of the tank and extend as a transverse support across the peripheral wall. Thus the end walls 30 and 31 cannot pull away from the peripheral wall of the tank should the wall in any way distort so that the end walls act as a perfect seal of one tank module from the next tank module. In addition the direct connection of the end walls to the peripheral wall provides additional strength of the peripheral wall so that it is supported against any inward distortion caused by external loading on the wall as discussed previously.

As best shown in FIG. 5, both the end walls includes a flat portion so that the walls can lie in directly abutting and contacting relationship. In the embodiment shown flat wall covers the whole of the area inwardly of the peripheral wall s that the junction line 24 is effectively invisible in the finished tank.

The end wall 30 as shown in FIG. 3 includes a plurality of scribed circles 32 which are formed by indentations in the mold so that the circles are not cut through the material but are just defined visibly in the material to allow selection of those openings intended to be cut in the end wall.

Depending upon the intended operation of the tank, various ones of the scribed circles 32 can be cut through using a suitable cutting implement. The tank modules can then be connected together by coupling members shown in FIG. 5 and indicated at 33.

The selection of the openings will be well known to one skilled in the art based upon conventional operation techniques of septic and holding tank systems.

Each coupling member comprises a first coupling part having a head 34 and a male screw threaded projecting portion 35 which can extend through the openings cut at the marked positions 32. On the outer surface of the male portion 35 is attached a nut 36 so that the head 34 and nut 36 act to clamp a portion of the end walls 30 and 31 together to hold the walls in clamped position. As shown in FIG. 3, the coupling member 33 has a central opening 37 allowing communication of fluid from one tank module to the other tank module. Other coupling members may be free from the central opening as required. Thus the tank parts can be clamped together at a plurality of positions on the end wall sufficient to hold the end walls in abutting relationship and to prevent twisting or distorting of the tank.

In some cases as described hereinafter, a piped connection is necessary between one compartment and the next. In this case a pipe 38 can pass through two aligned openings 39 in the end walls 30 and 31. In order to provide an effective seal, a sleeve seal 40 is inserted in the opening so that the pipe passes through a central bore of the sleeve to prevent any liquid escaping into the area between the end walls 30 and 31. In this case all the coupling members can be of the closed or blind type which prevent communication fluid between the two compartments. The open coupling elements are conventionally available and are known as bulkhead fittings and are used for providing an exit opening and a connector at the exit of a conventionally formed tank. In this case, however, the bulkhead fittings are used to connect the two end walls together to form an integral or complete tank from the tank modules.

The end wall 30 as shown in FIG. 3 also extends up along the bottom portion 28 of the cylindrical access opening. The end wall forms a diametrically extending wall across the access opening. In the originally molded part, the upper edge of the end wall extends right up to the top edge of the cylindrical wall 28. However before assembly of the tank parts, the end wall is cut down as indicated at 41 so that the bottom edge of the cut out extends to a position below the top edge 42 of the upper wall part 14. Thus when the end walls are connected together, a complete circular opening is exposed at the upper edge of the bottom portion 28 to allow access by a person vertically downwardly into the circular cylindrical area defined by the wall 28. In addition the cutout 41 allows the person entering this access opening to move either to the left or to the right as required to enter a chosen one of the tank modules for service or for assembly of the connecting members previously described.

In this way, the single access opening allows access to both tank modules thus avoiding the necessity of two separate access openings.

Turning now to FIG. 2, the end face 13 is shown which includes a plurality of vertical ribs 44 to again provide a strengthening effect of the end wall. In the embodiment shown, the end walls are substantially vertical and parallel but it will be appreciated that the end walls can take up any required shape provided of course the abutting or connecting end walls include the necessary flat surfaces to provide the necessary connection and to allow the communication of fluid as required therebetween.

Figure 6:
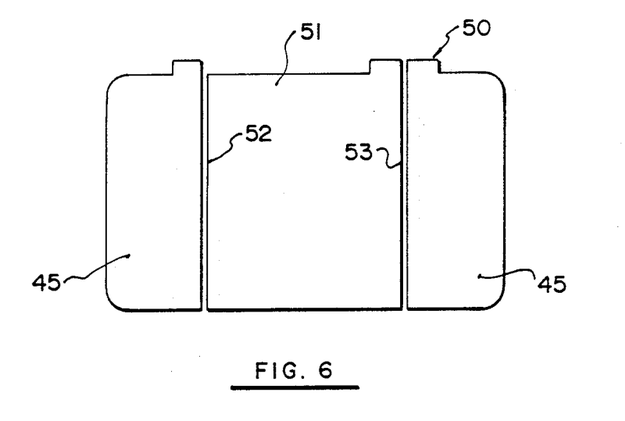
FIGS. 6, 7, 8 and 9 are schematic side elevational views of various tanks formed from the modular tank parts of the present invention.
Figure 7:
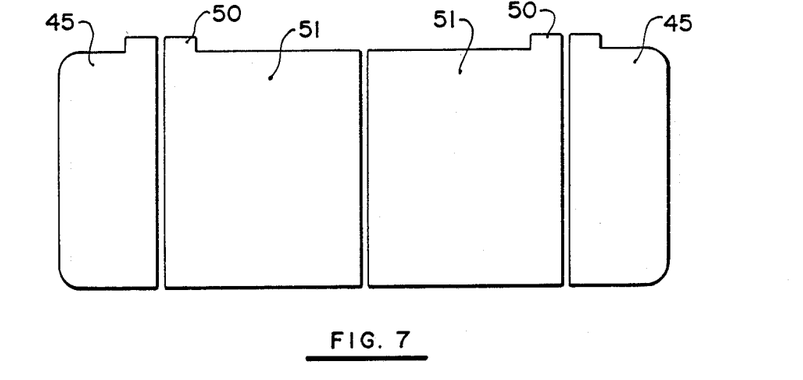
Figure 8:
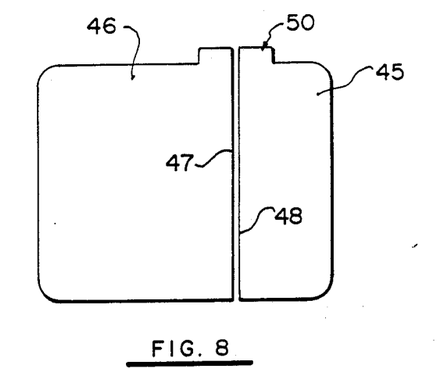

Turning now to FIGS. 6 through 9, the tank of FIGS. 1 through 5 is shown schematically in FIG. 8 as comprising the two separate parts indicated at 45 and 46 connected along the abutting end walls 47 and 48 as previously described. A portion of the access opening is indicated at 50. Thus the tank comprises a first module 45 and a second module 46 which are connected together to form a relatively small tank which in the example shown is a septic tank of nominally 1800 liters capacity.

FIG. 6 shows a further tank which comprises two of the modules 45 and a second module 51. The module 51 is different from the module 46 in that it includes two end walls of the connecting type which are thus flat and indicated at 52 and 53. These end walls connect to the adjacent end walls of the modules 45. In the example shown the septic tank is of nominal capacity of 2700 liters.

The opening 50 as previously described provides a single complete access opening in the arrangement of FIG. 6. The part access opening of the left hand module 45 can be used to provide merely a small opening for visual inspection, extraction of materials by suction and for inserting the necessary parts of the coupling members during initial assembly.

In FIG. 7 is shown a yet further tank construction comprising two of the modules 45 and two of the modules 51 connected together as previously described. In this case the tank includes two separate access openings 50 each communicating with two of the modules as previously described. The tank illustrated has a nominal capacity of 4500 liters.

Figure 9:
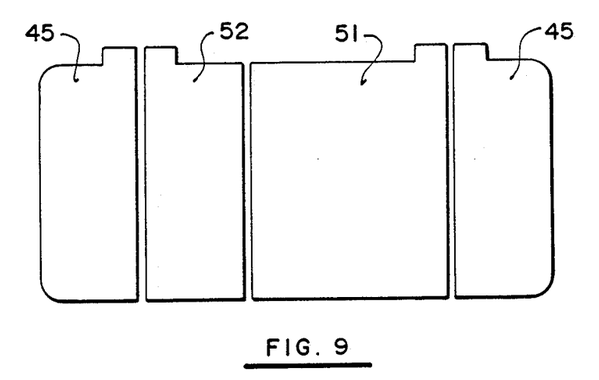

In FIG. 9 is illustrated a yet further tank of 3600 liters nominal capacity which includes two of the modules 45, one of the modules 51 and a yet further module 52. The module 52 is similar to the module 51 in that it includes one half of an access opening 50 and two flat end walls of the coupling type.

It will be appreciated that tanks of varying capacities can therefore be manufactured by connecting together various ones of the modules 45, 46, 51 and 52. Thus to manufacture tanks of the various different capacities, it is necessary only to keep an inventory of four different types of modules and interconnect these together as required. The connecting is carried out as previously described by cutting out the required ones of the scribed circles and then insertion of the necessary coupling members. The tanks illustrated are of course of example only and various different sizes can be manufactured by different combinations as will be appreciated.

The tank formed from the tank modules can be used for storing various liquids in an underground buried location. Such tanks are often used for the storing of clean water or as holding tanks for sewage waste. In both cases, the tank modules are connected together by a number of the bulkhead fittings so that liquid can simply flow at a number of positions across the end walls from one compartment to the next compartment so that all compartments remain equally filled. It may be necessary to provide further openings above the intended water line. The cut down portion of the end walls provided for the access opening will in addition allow communication of air from one compartment to the next compartment.

When used in septic tank system, the different modules provide the separate compartments for the septic tank system. In a septic tank system there is generally a septic compartment in which the waste material is initially stored to undergo the septic break down. In some systems there is only one septic chamber from which the liquid is drawn off into an effluent chamber. The effluent chamber provides a holding area so that the liquid can be then pumped out or trickled out into a septic field system. In other cases a second septic compartment is provided so that the material undergoes a first septic process, is transferred to a second septic compartment in which it undergoes a second septic process and from the second septic compartment is transferred to the effluent chamber.

The septic compartment must have a certain volume of air above the septic liquid. In the septic process a scum is formed on the upper surface of the liquid which cooperates with the air in the septic process. On the bottom of the compartment is a layer of solid material. Between the scum and the solid material is the liquid which is intended to be removed. As shown in FIG. 5, therefore, the pipe 38 includes an inlet portion on the left hand side of the bulkhead which is the septic compartment. The inlet portion has a mouth at a depth lower than the coupling portion which passes through the seal 40 so that instead of the upper surface of the liquid being disturbed by running over into the effluent chamber, the liquid which runs over into the effluent chamber is drawn from a lower level.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A tank for containing liquid materials comprising a plurality of tank modules, each module being separately molded from a plastics material to define a hollow substantially closed integrally molded container defined by a pair of spaced end walls transverse to a horizontal axis of the container and a peripheral wall having an upper wall portion and a base wall portion and substantially surrounding said axis, the end walls being integrally molded with the wall portions so that the peripheral wall is connected to the end walls such that the end walls extend as a transverse support across the wall portions of the peripheral wall to act as a structural support therefor, a connecting one of the pair of end walls of one tank module being connected to a connecting one of the pair of end walls of a next adjacent tank module, each one of the connecting end walls having a part thereof shaped so as to cooperate with a part of the other of the connecting walls in a contacting relationship, a plurality of clamping members, each clamping member passing through the contacting parts of the end walls at a position thereon spaced from the other clamping members so as to hold said end walls clamped together in said contacting relationship, and means defining cooperating openings in said contacting parts allowing communication of said liquid materials from said one tank module to said next adjacent tank module.

2. The invention according to claim 1 wherein said connecting end walls are substantially flat across the full extent thereof and wherein the other of said pair of end walls of each of the tank modules includes structurally reinforcing ribs therein so as to define outer ends of the tank.

3. The invention according to claim 1 wherein each clamping member comprises a bolt portion with a head at one end and a male screw threaded member extending outwardly from the head so as to pass through openings in the connecting ones of the end walls and a nut member having a female screw thread for application to the male screw threaded member to clamp the connecting ones of the end walls together.

4. The invention according to claim 1 wherein at least some of the clamping members define a channel therethrough allowing the flow of said liquid materials from said one tank module to said next adjacent tank module.

5. The invention according to claim 4 wherein means for communicating the flow of fluid from one tank module to the next adjacent tank module consists solely of the connecting members.

6. The invention according to claim 4 wherein each of the connecting end walls has a plurality of circular scribe markings thereon defining the positions of required openings for receiving a clamping member such that selected ones of the openings can be cut to define a required communication of fluid between the tank modules.

7. The invention according to claim 1 wherein the tank includes an access opening in an upper part of the peripheral wall thereof, the access opening having a cylindrical wall forming an upwardly facing opening through which a person can enter, one part of the cylindrical wall being formed on said one tank module and another cooperating part of the cylindrical wall being formed on said next adjacent tank module.

8. The invention according to claim 7 wherein the connecting end walls between said one tank module and said next adjacent tank module are cut down at the access opening to a level below the upper wall part thereof such that a person entering the access opening can access either of the tank modules from the single access opening.

9. The invention according to claim 1 wherein the tank is arranged for treatment of septic waste with one of the separate tank modules defining a septic chamber and another of the tank modules defining an effluent chamber.

10. The invention according to claim 9 wherein a fluid connector between said septic chamber and said effluent chamber comprises a pipe which has a coupling portion thereof passing through aligned openings in said cooperating ports and a portion depending from said coupling portion to an open mouth in said septic chamber.

11. The invention according to claim 1 wherein the peripheral wall includes an upper wall portion, a base wall portion and a pair of junction portions each connecting a respective side edge of the base wall portion to a respective side edge of the upper wall portion, the peripheral wall being shaped such that, in a cross section taken in a direction transverse to the side edges, the upper wall portion defines a smoothly curved parabolic arch and the base wall portion has a curvature less than that of the upper wall portion.

12. The invention according to claim 11 wherein the base wall portion is substantially flat in comparison with the upper wall portion.

13. The invention according to claim 11 wherein the base wall portion includes a central portion thereof which is substantially flat and two outward portions thereof extending from the central portion to the side edges which are inclined upwardly from the central portion at a shallow angle thereto.

14. The invention according to claim 11 wherein both the base wall portion and the upper wall portion are shaped to define a plurality of ribs extending peripherally around the container.

15. A set of parts for forming a septic tank for containing liquid materials comprising a plurality of tank modules each module being separately molded from a plastics material to define a hollow substantially closed integrally molded container defined by a pair of spaced end walls transverse to a horizontal axis of the container and a peripheral wall having an upper wall portion and a base wall portion and substantially surrounding said axis, the end walls being integrally molded with the wall portion so that the peripheral wall is integrally connected to the end walls such that the end walls extend as a transverse support across the wall portions of the peripheral wall to act as a structural support therefor, a connecting one of the pair of end walls of each tank module having a substantially flat wall part for connecting to a substantially flat wall part of a connecting one of the end walls of a next adjacent tank module, means for connecting the connecting end wall of each tank module to the connecting end wall of the next adjacent tank module, means allowing communication of fluid from one tank module to the next adjacent tank module to form a septic tank with the connecting end walls defining bulkheads of the septic tank, at least one of the tank modules having as both of the end walls thereof a respective one of a pair of connecting end walls and at least one of the tank modules having as one of the end walls thereof an outer end wall which is different from the connecting end wall thereof so as to define an outer end of the tank.

16. The invention according to claim 15 wherein there is provided at least two first tank modules having as both of the end walls thereof a respective one of a pair of connecting end walls, said at least two tank modules having different capacities and wherein there is provided at least two second tank modules having as one of the end walls thereof an outer end wall which is different from the connecting end wall thereof so as to define an outer end of the tank, the at least two second tank modules having different capacities.

17. The invention according to claim 15 including a plurality of clamping members, each passing through the contacting parts of the end walls at a position thereon spaced from the other clamping members so as to hold said end walls clamped together in said contacting relationship and wherein at least some of the clamping members define a channel therethrough allowing the flow of said liquid materials from said one tank module to said next adjacent tank module.

18. The invention according to claim 15 wherein the tank includes an access opening in an upper part of the peripheral wall thereof, the access opening having a cylindrical wall forming an upwardly facing opening through which a person can enter, one part of the cylindrical wall being formed on said one tank module and another cooperating part of the cylindrical wall being formed on said next adjacent tank module.

19. The invention according to claim 15 wherein the peripheral wall includes an upper wall portion, a base wall portion and a pair of junction portions each connecting a respective side edge of the base wall portion to a respective side edge of the upper wall portion, the peripheral wall being shaped such that, in a cross section taken in a direction transverse to the side edges, the upper wall portion defines a smoothly curved parabolic arch and the base wall portion has a curvature less than that of the upper wall portion.

* * * * *